United States Patent
Holm et al.

(10) Patent No.: US 11,010,425 B2
(45) Date of Patent: May 18, 2021

(54) PERSISTED ENTERPRISE GRAPH QUERIES

(71) Applicant: Microsoft Technology Licensing, LLC, Redmond, WA (US)

(72) Inventors: Fredrik Holm, Oslo (NO); Josh Stickler, Oslo (NO); Manfred Berry, Oslo (NO); Sveinar Rasmussen, Oslo (NO); Bjørn Olstad, Stathelle (NO)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 227 days.

(21) Appl. No.: 15/833,453

(22) Filed: Dec. 6, 2017

(65) Prior Publication Data

US 2018/0096076 A1 Apr. 5, 2018

Related U.S. Application Data

(63) Continuation of application No. 14/188,079, filed on Feb. 24, 2014, now Pat. No. 9,870,432.

(51) Int. Cl.
*G06F 16/901* (2019.01)
(52) U.S. Cl.
CPC ................ *G06F 16/9024* (2019.01)
(58) Field of Classification Search
CPC .................................................. G06F 16/9024
See application file for complete search history.

(56) References Cited

U.S. PATENT DOCUMENTS 6,434,556 B1  8/2002 Levin et al.
6,745,195 B1* 6/2004 Kornfein ................. G06F 16/38
(Continued)

FOREIGN PATENT DOCUMENTS

CN        1666279 A    9/2005
CN      102150161 A    8/2011
(Continued)

OTHER PUBLICATIONS

Pradel et al., "Natural language query interpretation into SPARQL using patterns," Fourth International Workshop on Consuming Linked Data—COLD 2013, Oct. 2013, Sydney, Australia. (Year: 2013).*

(Continued)

*Primary Examiner* — Jay A Morrison
(74) *Attorney, Agent, or Firm* — Merchant & Gould P.C.

(57) ABSTRACT

A computer search service can receive an enterprise graph query from a client computing device that is remote from the computer search service, with the enterprise graph query identifying an actor object set, a target object set, and a relationship between the actor object set and the target object set. The search service can return results of the enterprise graph query to the client device. The search service can receive from the client device an indication of user input instructing the search service to persist the enterprise graph query, with the indication of user input also instructing the search service to associate the persisted enterprise graph query with an entity. Moreover, in response to receiving the indication of user input, the search service can persist the enterprise graph query as well as associate the persisted enterprise graph query with the entity and/or enter a subscription entry for the query.

20 Claims, 9 Drawing Sheets

(56) References Cited

U.S. PATENT DOCUMENTS

| | | |
|---|---|---|
| 7,031,961 B2 | 4/2006 | Pitkow et al. |
| 7,055,168 B1 | 5/2006 | Errico et al. |
| 7,444,344 B2 | 10/2008 | Galindo-Legaria et al. |
| 7,509,320 B2 | 3/2009 | Hess et al. |
| 7,571,121 B2 | 8/2009 | Bezos et al. |
| 7,577,718 B2 | 8/2009 | Slawson et al. |
| 7,587,101 B1 | 9/2009 | Bourdev |
| 7,640,236 B1 | 12/2009 | Pogue |
| 7,756,945 B1 | 7/2010 | Andreessen et al. |
| 7,761,447 B2 | 7/2010 | Brill et al. |
| 7,783,630 B1 | 8/2010 | Chevalier et al. |
| 7,788,245 B1 | 8/2010 | Eddings et al. |
| 7,873,641 B2 | 1/2011 | Frieden et al. |
| 7,890,501 B2 | 2/2011 | Lunt et al. |
| 7,945,571 B2 | 5/2011 | Wanker |
| 7,958,116 B2 | 6/2011 | House et al. |
| 7,962,481 B2 | 6/2011 | Ganesh et al. |
| 8,005,817 B1 | 8/2011 | Amer-Yahia et al. |
| 8,060,513 B2 | 11/2011 | Basco et al. |
| 8,065,383 B2 | 11/2011 | Carlson et al. |
| 8,117,197 B1 | 2/2012 | Cramer |
| 8,204,870 B2 | 6/2012 | Mukkamala et al. |
| 8,204,888 B2 | 6/2012 | Frieden et al. |
| 8,209,349 B2 | 6/2012 | Howes et al. |
| 8,214,325 B2 | 7/2012 | Navas |
| 8,266,144 B2 | 9/2012 | Tankovich et al. |
| 8,301,764 B2 | 10/2012 | Konig et al. |
| 8,312,056 B1 | 11/2012 | Peng et al. |
| 8,341,017 B2 | 12/2012 | Payne et al. |
| 8,341,150 B1 | 12/2012 | Riley et al. |
| 8,346,765 B2 | 1/2013 | Guo et al. |
| 8,346,950 B1 | 1/2013 | Andreessen et al. |
| 8,380,562 B2 | 2/2013 | Toebes et al. |
| 8,386,515 B2 | 2/2013 | Bent et al. |
| 8,463,795 B2 | 6/2013 | Van Hoff |
| 8,538,959 B2 | 9/2013 | Jin et al. |
| 8,548,996 B2 | 10/2013 | Tareen et al. |
| 8,572,477 B1 | 10/2013 | Moskovitz et al. |
| 8,600,981 B1 | 12/2013 | Chau et al. |
| 8,601,023 B2 | 12/2013 | Brave et al. |
| 8,751,621 B2 | 6/2014 | Vaynblat et al. |
| 8,751,636 B2 | 6/2014 | Tseng et al. |
| 8,775,334 B1 | 7/2014 | Lloyd et al. |
| 8,782,036 B1 | 7/2014 | Chen et al. |
| 8,799,296 B2 | 8/2014 | Agapiev |
| 8,812,947 B1 | 8/2014 | Maoz et al. |
| 8,825,649 B2 | 9/2014 | Heimendinger et al. |
| 8,825,711 B2 | 9/2014 | Chan et al. |
| 8,874,550 B1 | 10/2014 | Soubramanien et al. |
| 8,886,633 B2 | 11/2014 | Smyth et al. |
| 8,898,156 B2 | 11/2014 | Xu et al. |
| 8,909,515 B2 | 12/2014 | O'Neil et al. |
| 8,984,098 B1 | 3/2015 | Tomkins et al. |
| 8,996,631 B1 | 3/2015 | Staddon et al. |
| 9,165,305 B1 | 10/2015 | Chandra et al. |
| 9,177,293 B1 | 11/2015 | Gagnon et al. |
| 9,195,679 B1 | 11/2015 | Svendsen |
| 9,223,866 B2 | 12/2015 | Marcucci et al. |
| 9,438,619 B1 | 9/2016 | Chan et al. |
| 9,514,191 B2 | 12/2016 | Solheim et al. |
| 9,542,440 B2 | 1/2017 | Wang et al. |
| 9,576,007 B1 | 2/2017 | Sivathanu et al. |
| 9,870,432 B2 | 1/2018 | Holm et al. |
| 2001/0034859 A1 | 10/2001 | Swoboda et al. |
| 2002/0038299 A1 | 3/2002 | Zernik et al. |
| 2002/0091736 A1 | 7/2002 | Wall |
| 2002/0169759 A1 | 11/2002 | Kraft et al. |
| 2003/0025692 A1 | 2/2003 | Lu et al. |
| 2003/0071814 A1 | 4/2003 | Jou et al. |
| 2003/0115271 A1 | 6/2003 | Weissman |
| 2004/0103088 A1* | 5/2004 | Cragun ............... G06F 16/256 |
| 2004/0255237 A1 | 12/2004 | Tong |
| 2004/0267736 A1 | 12/2004 | Yamane et al. |
| 2005/0076240 A1 | 4/2005 | Appleman |
| 2005/0076241 A1 | 4/2005 | Appleman |
| 2005/0201535 A1 | 9/2005 | LaLonde et al. |
| 2005/0203929 A1 | 9/2005 | Hazarika et al. |
| 2005/0246420 A1 | 11/2005 | Little, II |
| 2005/0278321 A1 | 12/2005 | Vailaya et al. |
| 2005/0278325 A1 | 12/2005 | Mihalcea et al. |
| 2006/0004892 A1 | 1/2006 | Lunt et al. |
| 2006/0074883 A1 | 4/2006 | Teevan et al. |
| 2006/0123014 A1 | 6/2006 | Ng |
| 2006/0168036 A1 | 7/2006 | Schulz et al. |
| 2006/0294085 A1 | 12/2006 | Rose et al. |
| 2007/0162443 A1 | 7/2007 | Liu et al. |
| 2007/0192306 A1 | 8/2007 | Papakonstantinou et al. |
| 2007/0208751 A1 | 9/2007 | Cowan et al. |
| 2008/0005064 A1 | 1/2008 | Sarukkai |
| 2008/0010337 A1 | 1/2008 | Hayes et al. |
| 2008/0010350 A1 | 1/2008 | Chen et al. |
| 2008/0016053 A1 | 1/2008 | Frieden et al. |
| 2008/0086344 A1 | 4/2008 | Martini et al. |
| 2008/0097968 A1 | 4/2008 | Delgado et al. |
| 2009/0049053 A1 | 2/2009 | Barker et al. |
| 2009/0094233 A1 | 4/2009 | Marvit et al. |
| 2009/0125560 A1 | 5/2009 | Munekuni et al. |
| 2009/0132490 A1 | 5/2009 | Okraglik |
| 2009/0132516 A1 | 5/2009 | Patel et al. |
| 2009/0150866 A1 | 6/2009 | Schmidt |
| 2009/0182727 A1 | 7/2009 | Majko |
| 2009/0256678 A1 | 10/2009 | Ryu |
| 2009/0313295 A1 | 12/2009 | Blaxland et al. |
| 2009/0327271 A1 | 12/2009 | Amitay et al. |
| 2010/0063878 A1 | 3/2010 | Bachet et al. |
| 2010/0082695 A1 | 4/2010 | Hardt |
| 2010/0083151 A1 | 4/2010 | Lanza et al. |
| 2010/0169320 A1 | 7/2010 | Patnam et al. |
| 2010/0169326 A1 | 7/2010 | Ma et al. |
| 2010/0179874 A1 | 7/2010 | Higgins et al. |
| 2010/0185610 A1 | 7/2010 | Lunt et al. |
| 2010/0223266 A1 | 9/2010 | Balmin et al. |
| 2010/0268703 A1 | 10/2010 | Buck |
| 2010/0306185 A1 | 12/2010 | Smith et al. |
| 2010/0332330 A1 | 12/2010 | Goel et al. |
| 2011/0004831 A1 | 1/2011 | Steinberg et al. |
| 2011/0040617 A1 | 2/2011 | Moonka et al. |
| 2011/0055241 A1 | 3/2011 | Lewis |
| 2011/0060803 A1 | 3/2011 | Berlin et al. |
| 2011/0087644 A1 | 4/2011 | Frieden et al. |
| 2011/0099167 A1 | 4/2011 | Galbreath et al. |
| 2011/0145275 A1 | 6/2011 | Stewart |
| 2011/0145719 A1 | 6/2011 | Chen et al. |
| 2011/0214046 A1 | 9/2011 | Haberman et al. |
| 2011/0218946 A1 | 9/2011 | Stern et al. |
| 2011/0231381 A1 | 9/2011 | Mercuri |
| 2011/0264737 A1 | 10/2011 | Skinner |
| 2011/0271224 A1 | 11/2011 | Cruz Moreno et al. |
| 2012/0030169 A1 | 2/2012 | Allen et al. |
| 2012/0047114 A1 | 2/2012 | Duan et al. |
| 2012/0054303 A1 | 3/2012 | Priyadarshan et al. |
| 2012/0076367 A1 | 3/2012 | Tseng |
| 2012/0078896 A1 | 3/2012 | Nixon et al. |
| 2012/0079004 A1 | 3/2012 | Herman |
| 2012/0084291 A1 | 4/2012 | Chung et al. |
| 2012/0124041 A1 | 5/2012 | Bawri et al. |
| 2012/0158720 A1 | 6/2012 | Luan |
| 2012/0158791 A1 | 6/2012 | Kasneci et al. |
| 2012/0209859 A1 | 8/2012 | Blount |
| 2012/0209878 A1 | 8/2012 | Park et al. |
| 2012/0210240 A1 | 8/2012 | Neystadt et al. |
| 2012/0215771 A1 | 8/2012 | Steiner |
| 2012/0215773 A1 | 8/2012 | Si et al. |
| 2012/0221558 A1 | 8/2012 | Byrne et al. |
| 2012/0221566 A1 | 8/2012 | Iwasa et al. |
| 2012/0239618 A1 | 9/2012 | Kung |
| 2012/0254790 A1 | 10/2012 | Colombino et al. |
| 2012/0271807 A1 | 10/2012 | Smyth et al. |
| 2012/0290399 A1 | 11/2012 | England et al. |
| 2012/0290637 A1 | 11/2012 | Perantatos et al. |
| 2012/0296918 A1 | 11/2012 | Morris et al. |
| 2012/0304215 A1 | 11/2012 | McCarthy et al. |
| 2012/0310922 A1 | 12/2012 | Johnson et al. |
| 2012/0311139 A1 | 12/2012 | Brave et al. |

(56) References Cited

U.S. PATENT DOCUMENTS

| | | |
|---|---|---|
| 2012/0323998 A1 | 12/2012 | Schoen et al. |
| 2012/0324002 A1 | 12/2012 | Chen |
| 2012/0324027 A1 | 12/2012 | Vaynblat et al. |
| 2012/0330908 A1 | 12/2012 | Stowe et al. |
| 2012/0330992 A1 | 12/2012 | Kanigsberg et al. |
| 2013/0006754 A1 | 1/2013 | Horvitz et al. |
| 2013/0013678 A1 | 1/2013 | Murthy |
| 2013/0031489 A1 | 1/2013 | Gubin et al. |
| 2013/0036230 A1 | 2/2013 | Bakos |
| 2013/0041896 A1 | 2/2013 | Ghani et al. |
| 2013/0054349 A1 | 2/2013 | Ogawa |
| 2013/0073280 A1 | 3/2013 | O'Neil et al. |
| 2013/0073568 A1 | 3/2013 | Federov et al. |
| 2013/0073632 A1 | 3/2013 | Fedorov et al. |
| 2013/0073979 A1 | 3/2013 | Shepherd et al. |
| 2013/0073983 A1 | 3/2013 | Rasmussen et al. |
| 2013/0080218 A1 | 3/2013 | Wildern, IV et al. |
| 2013/0086057 A1 | 4/2013 | Harrington et al. |
| 2013/0091149 A1 | 4/2013 | Dunn et al. |
| 2013/0097143 A1 | 4/2013 | Shenoy et al. |
| 2013/0097184 A1 | 4/2013 | Berkhin et al. |
| 2013/0103683 A1 | 4/2013 | Haveliwala et al. |
| 2013/0110638 A1 | 5/2013 | Ogawa |
| 2013/0110802 A1 | 5/2013 | Shenoy et al. |
| 2013/0110827 A1 | 5/2013 | Nabar et al. |
| 2013/0110978 A1 | 5/2013 | Gordon et al. |
| 2013/0124437 A1 | 5/2013 | Pennacchiotti et al. |
| 2013/0124613 A1 | 5/2013 | Plache et al. |
| 2013/0132138 A1 | 5/2013 | Doganata et al. |
| 2013/0151611 A1 | 6/2013 | Graham et al. |
| 2013/0155068 A1 | 6/2013 | Bier et al. |
| 2013/0159096 A1 | 6/2013 | Santhanagopal et al. |
| 2013/0167059 A1* | 6/2013 | Legris .................. G06F 3/0482 715/769 |
| 2013/0191416 A1 | 7/2013 | Lee et al. |
| 2013/0204706 A1 | 8/2013 | Tang et al. |
| 2013/0212081 A1 | 8/2013 | Shenoy et al. |
| 2013/0218885 A1 | 8/2013 | Satyanarayanan |
| 2013/0218899 A1 | 8/2013 | Raghavan et al. |
| 2013/0227011 A1 | 8/2013 | Sharma et al. |
| 2013/0238449 A1 | 9/2013 | Ferreira et al. |
| 2013/0238587 A1 | 9/2013 | Annau et al. |
| 2013/0238588 A1 | 9/2013 | Annau et al. |
| 2013/0246404 A1 | 9/2013 | Annau et al. |
| 2013/0246405 A1 | 9/2013 | Annau et al. |
| 2013/0246521 A1 | 9/2013 | Schacht et al. |
| 2013/0262588 A1 | 10/2013 | Barak et al. |
| 2013/0268973 A1 | 10/2013 | Archibong et al. |
| 2013/0288715 A1 | 10/2013 | Shieh et al. |
| 2013/0290323 A1 | 10/2013 | Saib |
| 2013/0298084 A1 | 11/2013 | Spivack et al. |
| 2013/0326369 A1 | 12/2013 | Buchanon |
| 2013/0332523 A1 | 12/2013 | Luu |
| 2013/0346329 A1 | 12/2013 | Alib-Bulatao et al. |
| 2014/0007860 A1 | 1/2014 | Lu |
| 2014/0013353 A1 | 1/2014 | Mathur |
| 2014/0032563 A1 | 1/2014 | Lassen et al. |
| 2014/0040008 A1 | 2/2014 | Belani et al. |
| 2014/0040244 A1 | 2/2014 | Rubinstein et al. |
| 2014/0040245 A1 | 2/2014 | Rubinstein et al. |
| 2014/0040246 A1 | 2/2014 | Rubinstein et al. |
| 2014/0040367 A1 | 2/2014 | Lessin et al. |
| 2014/0040370 A1 | 2/2014 | Buhr |
| 2014/0040729 A1 | 2/2014 | Marlow et al. |
| 2014/0041038 A1 | 2/2014 | Lessin et al. |
| 2014/0046982 A1 | 2/2014 | Chan et al. |
| 2014/0074602 A1 | 3/2014 | van Elsas et al. |
| 2014/0074888 A1 | 3/2014 | Potter |
| 2014/0074934 A1 | 3/2014 | van Hoff et al. |
| 2014/0114986 A1 | 4/2014 | Bierner et al. |
| 2014/0156652 A1 | 6/2014 | Abiola |
| 2014/0164388 A1 | 6/2014 | Zhang et al. |
| 2014/0173459 A1 | 6/2014 | Gaiser et al. |
| 2014/0181083 A1 | 6/2014 | Macho et al. |
| 2014/0181091 A1 | 6/2014 | Lassen et al. |
| 2014/0188899 A1 | 7/2014 | Whitnah et al. |
| 2014/0189530 A1 | 7/2014 | Anand et al. |
| 2014/0195605 A1 | 7/2014 | Kallayil |
| 2014/0207860 A1 | 7/2014 | Wang et al. |
| 2014/0208234 A1 | 7/2014 | Amit et al. |
| 2014/0215351 A1 | 7/2014 | Gansca et al. |
| 2014/0229293 A1 | 8/2014 | Huang et al. |
| 2014/0278986 A1 | 9/2014 | Rouse et al. |
| 2014/0280080 A1 | 9/2014 | Solheim et al. |
| 2014/0280108 A1* | 9/2014 | Dunn .................. G06F 16/335 707/728 |
| 2014/0282029 A1 | 9/2014 | Vishria |
| 2014/0324850 A1 | 10/2014 | Magnaghi et al. |
| 2014/0330551 A1 | 11/2014 | Bao et al. |
| 2014/0330809 A1 | 11/2014 | Raina et al. |
| 2014/0330818 A1 | 11/2014 | Raina et al. |
| 2014/0330819 A1 | 11/2014 | Raina et al. |
| 2014/0337316 A1* | 11/2014 | Abuelsaad .......... G06F 16/9535 707/722 |
| 2014/0344288 A1 | 11/2014 | Evans et al. |
| 2014/0359023 A1 | 12/2014 | Homsany |
| 2015/0039596 A1 | 2/2015 | Stewart |
| 2015/0039632 A1 | 2/2015 | Leppanen et al. |
| 2015/0058758 A1 | 2/2015 | Tseng |
| 2015/0067505 A1 | 3/2015 | Metcalf et al. |
| 2015/0081449 A1 | 3/2015 | Ge et al. |
| 2015/0100644 A1 | 4/2015 | Gulik |
| 2015/0106191 A1 | 4/2015 | Ge et al. |
| 2015/0120700 A1 | 4/2015 | Holm et al. |
| 2015/0127677 A1 | 5/2015 | Wang et al. |
| 2015/0142785 A1 | 5/2015 | Roberts et al. |
| 2015/0187024 A1 | 7/2015 | Karatzoglou et al. |
| 2015/0220531 A1 | 8/2015 | Helvik et al. |
| 2015/0242473 A1 | 8/2015 | Brugard et al. |
| 2015/0248222 A1 | 9/2015 | Stickler et al. |
| 2015/0248410 A1 | 9/2015 | Stickler et al. |
| 2015/0248480 A1 | 9/2015 | Miller et al. |
| 2015/0249715 A1 | 9/2015 | Helvik et al. |
| 2015/0294138 A1 | 10/2015 | Barak et al. |
| 2015/0363402 A1 | 12/2015 | Jackson et al. |
| 2015/0363407 A1 | 12/2015 | Huynh et al. |
| 2015/0379586 A1 | 12/2015 | Mooney et al. |
| 2015/0381552 A1 | 12/2015 | Vijay et al. |
| 2016/0034469 A1 | 2/2016 | Livingston et al. |
| 2016/0070764 A1 | 3/2016 | Helvik et al. |
| 2016/0117740 A1 | 4/2016 | Linden et al. |
| 2016/0203510 A1 | 7/2016 | Pregueiro et al. |
| 2017/0072002 A1 | 3/2017 | Bafundo et al. |
| 2017/0091644 A1 | 3/2017 | Chung et al. |
| 2019/0180204 A1 | 6/2019 | Stickler et al. |
| 2020/0358864 A1 | 11/2020 | Helvik et al. |

FOREIGN PATENT DOCUMENTS

| | | |
|---|---|---|
| CN | 102298612 A | 12/2011 |
| CN | 102567326 A | 7/2012 |
| CN | 102693251 A | 9/2012 |
| CN | 102906689 A | 1/2013 |
| CN | 102930035 A | 2/2013 |
| EP | 2409271 A2 | 1/2012 |
| EP | 2426634 A1 | 3/2012 |
| EP | 2764489 A1 | 8/2014 |
| WO | 2008097969 A2 | 8/2008 |
| WO | 2008111087 A2 | 9/2008 |
| WO | 2010029410 A1 | 3/2010 |
| WO | 2012129400 A2 | 9/2012 |
| WO | 2013026095 A1 | 2/2013 |
| WO | 2013043654 A2 | 3/2013 |
| WO | 2013123550 A1 | 8/2013 |
| WO | 2013173232 A1 | 11/2013 |

OTHER PUBLICATIONS

Brinkley et al., "A query integrator and manager for the Query Web," Journal of biomedical informatics 45.5 (2012): 975-991. (Year: 2012).*

Yeung, Ken, "Yammer Unveils the Open Graph for the Enterprise, to Help make Business Apps More Social", Retrieved From: «http://

(56) References Cited

OTHER PUBLICATIONS thenextweb.com/insider/2012/10/29/yammer-using-the-enterprise-graph/!utm_source=feedburner&utm_medium=feed&utm_campaign=Feed:+TheNextWeb+(The+Next+Web+All+Stories), Oct. 29, 2012, 3 Pages.

Zhibao, et al., "EISI: An Extensible Security Enterprise Search System", In Proceedings of the International Conference on Computer Science and network technology (ICCSNT), Dec. 29, 2012, pp. 896-900.

"Corrected Notice of Allowance Issued in U.S. Appl. No. 14/188,079", dated Dec. 18, 2017, 2 Pages.

"8 Things Marketers Ought to Know About Facebooks New Trending Feature", Retrieved from: https://web.archive.org/save/https://www.facebook.com/notes/brandlogist/8-things-marketers-ought-to-know-about-facebooks-new-trending-feature/650859898308191/, Jan. 30, 2014, 5 Pages.

"Trending—Definition and Synonyms", Retrieved from: https://web.archive.org/web/20170618063522/http://www.macmillandictionary.com:80/us/dictionary/american/trending, Jul. 18, 2014, 1 Page.

Dayal, Priyanka, "How Many Tweets Make a Trend?", Retrieved from https://www.vuelio.com/uk/blog/how-many-tweets-make-a-trend/, Aug. 28, 2013, 5 Pages.

"Non Final Office Action Issued in U.S. Appl. No. 16/275,386", dated Aug. 29, 2019, 36 Pages.

"Final Office Action Issued in U.S. Appl. No. 14/064,393", dated Mar. 4, 2019, 19 Pages.

"Office Action Issued in European Patent Application No. 15710632.9", dated Feb. 18, 2019, 07 Pages.

"First Office Action and Search Report Issued in Chinese Patent Application No. 201580010703.5", dated Mar. 8, 2019, 12 Pages.

"First Office Action and Search Report Issued in Chinese Patent Application No. 201580011895.1", dated Mar. 5, 2019, 18 Pages.

"Second Office Action and Search Report Issued in Chinese Patent Application No. 201480058874.0", dated Jun. 26, 2019, 14 Pages.

"Advisory Action Issued in U.S. Appl. No. 14/064,393", dated Jun. 6, 2019, 6 Pages.

"Final Office Action Issued in U.S. Appl. No. 14/192,235", dated Jul. 25, 2019, 14 Pages.

"Non-Final Office Action Issued in U.S. Appl. No. 14/064,393", dated Sep. 26, 2019, 20 Pages.

"Non Final Office Action Issued in U.S. Appl. No. 14/192,235", dated Dec. 26, 2018, 16 Pages.

"Final Office Action Issued in U.S. Appl. No. 14/593,650", dated Jan. 4, 2019, 35 Pages.

"First Office Action & Search Report Issued in Chinese Patent Application No. 201480058874.0", dated Dec. 5, 2018, 14 Pages.

"Final Office Action Issued in U.S. Appl. No. 14/194,700", dated May 20, 2019, 25 Pages.

"Notice of Allowance Issued in U.S. Appl. No. 14/195,243", dated May 1, 2019, 10 Pages.

"Final Office Action Issued in U.S. Appl. No. 14/296,747", dated May 1, 2019, 30 Pages.

Bakhshandeh, et al.,"Personalized Search Based on Micro-Blogging Social Networks", In Proceedings of the CSI International Symposium on Artificial Intelligence and Signal Processing, May 2, 2012, 4 Pages.

Mishra, et al., "Improving Mobile Search through Location Based Context and Personalization", In Proceedings of the International Conference on Communication Systems and Network Technologies, May 11, 2012, 5 Pages.

"Office Action Issued in European Patent Application No. 15771764.6", dated May 13, 2019, 9 Pages.

"Bing Ads targeting-training", Retrieved From: https://web.archive.org/web/20160708102420/http://ads.bingads.microsoft.com/en-in/cl/245/training/bing-ads-targeting, Retrieved Date: Oct. 7, 2014, 4 Pages.

"Campaign Element Template Parameters-Training", Retrieved From: https://www-304.ibm.com/support/knowledgecenter/SSZLC2_7.0.0/com.ibm.commerce.management-center_customization.doc/concepts/csbcustargdef.htm, Retrieved Date: Oct. 1, 2014, 4 Pages.

"Connections Enterprise Content Edition", Retrieved From: http://www-03.ibm.com/software/products/en/connections-ecm/, Nov. 22, 2013, 6 Pages.

"Enterprise Search from Microsoft", In Microsoft White Paper, Jan. 2007, 16 Pages.

"Facets for Enterprise Search Collections", Retrieved From: http://pic.dhe.ibm.com/infocenter/analytic/v3r0m0/index.tsp?topic=%2Fcom.ibm.discovery.es.ad.doc%2Filysafacets.htm, Retrieved on: Jun. 17, 2014, 2 Pages.

"Getting started with your My Site", Retrieved From: http://office.microsoft.com/en-in/sharepoint-server-help/getting-started-with-your-my-site-HA101665444.aspx, Apr. 6, 2013, 6 Pages.

"How to Segment and Target Your Emails-Training", Retrieved From: https://www.marketo.com/ebooks/how-to-segment-and-target-your-emails/, Aug. 15, 2014, 17 Pages.

"Introduction to Managed Metadata", Retrieved From: http://office.microsoft.com/en-001/office365-sharepoint-online-enterprise-help/introduction-to-managed-metadata-HA102832521.aspx, Retrieved on: Jun. 23, 2014, 5 Pages.

Fox, Vanessa, "Marketing in the Age of Google", In Book Marketing in the Age of Google: Your Online Strategy is Your Business Strategy, Published by Wiley Publishing, Mar. 20, 2012, 3 pages.

"Persistent Search: Search's Next Big Battleground", Retrieved From: http://billburnham.blogs.com/burnhamsbeat/2006/04/persistent_sear.html, Apr. 10, 2006, 3 Pages.

"Turn search history off or on", Retrieved From: https://web.archive.org/web/20131124065852/http://onlinehelp.microsoft.com/en-US/bing/ff808483.aspx, Retrieved Date: Dec. 12, 2013, 1 Page.

"Yammer the Enterprise Social Network", Retrieved From: https://about.yammer.com/product/feature-list/, Sep. 39, 2013, 6 Pages.

"Final Office Action Issued in U.S Appl. No. 14/188,079", dated Dec. 6, 2016, 30 Pages.

"Non-Final Office Action Issued in U.S. Appl. No. 14/188,079", dated Apr. 21, 2017, 34 Pages.

"Non-Final Office Action Issued in U.S. Appl. No. 14/188,079", dated Jul. 15, 2016, 30 Pages.

"Notice of Allowance Issued in U.S. Appl. No. 14/188,079", dated Sep. 7, 2017, 7 Pages.

"Office Action Issued in European Patent Application No. 15710653.5", dated Jul. 27, 2017, 8 Pages.

Amitay, et al., "Social Search and Discovery using a Unified Approach", In Proceedings of the 20th ACM Conference on Hypertext and Hypermedia, Jun. 29, 2009, pp. 199-208.

Bailly, Nestor, "Finding the Best Video Content Using the Power of the Social Graph", Retrieved From: https://web.archive.org/web/20130721151603/http://iq.intel.com/iq/35820000/finding-the-best-video-content-using-the-power-of-the-social-graph, Jul. 17, 2013, 5 Pages.

Bobadilla, et al., "Recommender Systems Survey", In Journal of Knowledge-Based Systems, vol. 46, Jul. 1, 2013, pp. 109-132.

Daly, et al., "Social Lens: Personalization around user Defined Collections for Filtering Enterprise Message Streams", In Proceedings of the Fifth International AAAI Conference on Weblogs and Social Media, Jul. 17, 2011, pp. 113-120.

Diaz, et al., "SIGIR 2013 Workshop on Time Aware Information Access (#TAIA2013)", In Proceedings of the 36th International ACM SIGIR Conference on Research and Development in Information Retrieval, Aug. 1, 2013, 41 Pages.

Elbassuoni, et al., "Language-Model-Based Ranking for Queries on RDR-Graphs", In Proceedings of the 18th ACM Conference on Information and Knowledge Management, Nov. 2, 2009, 10 Pages.

Fan, et al., "Tuning Before Feedback: Combining Ranking Discovery and Blind Feedback for Robust Retrieval", In Proceedings of the 27th Annual International ACM SIGIR Conference on Research and Development in Information Retrieval, Jul. 25, 2004, 8 Pages.

Fazio, Stephanie, "How Social is Enterprise Search?", Retrieved From: http://web.archive.org/web/20120318142232/http://blogs.opentext.com/vca/blog/1.11.647/article/1.26.2007/2012/3/14/How_Social_is_Enterprise_Search%3F», Mar. 14, 2012, 3 Pages.

Giugno, et al., "GraphGrep: A Fast and Universal Method for Querying Graphs", In Proceedings of the 16th International Conference on Pattern Recognition, vol. 2, Aug. 11, 2002, 4 Pages.

(56) References Cited

OTHER PUBLICATIONS

Gruhl, et al., "The Web beyond Popularity—A Really Simple System for Web Scale RSS", In Proceedings of the 15th International Conference on World Wide Web, May 23, 2006, pp. 183-192.
Guy, et al., "Finger on the Pulse: The Value of the Activity Stream in the Enterprise", In Proceedings of the 14th IFIP TC 13th International Conference on Human-Computer Interaction, Sep. 2, 2013, 18 Pages.
Guy, et al., "Personalized Recommendation of Social Software Items Based on Social Relations", In Proceedings of the Third ACM Conference on Recommender Systems, Oct. 23, 2009, pp. 53-60.
Hackett, Wes, "Extending the Activity Feed with Enterprise Content", In Proceedings of the ActivityFeed, Development, Featured, Sharepoint, Social Features, Jun. 16, 2011, 27 Pages.
Hanada, Tetsuya, "Yammer- Enterprise Graph SharePoint", In Australian Sharepoint Conference, Jun. 11, 2013, 23 Pages.
Josh, "Send Notifications to your Customers in their Timezone-training", Retrieved From: https://mixpanel.com/blog/2014/08/19/announcement-send-notifications-in-your-customer-s-timezone, Aug. 19, 2014, 1 Page.
Kelly, et al., "The Effects of Topic Familiarity on Information Search Behavior", In Proceedings of the 2nd ACM/IEEE-CS Joint Conference on Digital Libraries, Jul. 14, 2002, 2 Pages.
Khodaei, et al., "Social-Textual Search and Ranking", In Proceedings of the First International Workshop on Crowdsourcing Web Search, Apr. 17, 2012, 6 Pages.
Kubica, et al "cGraph: A Fast Graph-Based Method for Link Analysis and Queries", In Proceedings of the IJCAI Text Mining & Link-Analysis Workshop, vol. 1, Aug. 22, 2003, 10 Pages.
Kuppusamy, Ashok, "Introducing Delve (codename Oslo) and the Office Graph", Retrieved From: https://web.archive.org/web/20160821142506/https://blogs.office.com/2014/03/11/introducing-codename-oslo-and-the-office-graph/, Mar. 11, 2014, 10 Pages.
Liang et al., "Highlighting in Information Visualization: A Survey", In Proceedings of the 14th International Conference Information Visualisation, Jul. 26, 2010, 7 Pages.
Li, et al., "Personalized Feed Recommendation Service for Social Networks", In Proceedings of the IEEE 2nd International Conference on Social Computing, Aug. 22, 2010, pp. 96-103.
Li, et al., "Research of Information Recommendation System Based on Reading Behavior", In Proceedings of the 7th International Conference on Machine Learning and Cybernetics, vol. 3, Jul. 12, 2008, pp. 1626-1631.
Masuch, Lukas, "Hack: Enterprise Knowledge Graph-One Graph to Connect them All", Retrieved From: http://www.managementexchange.com/hack/enterprise-knowledge-graph-one-graph-connect-them-all, Mar. 28, 2014, 8 Pages.
Muralidharan, et al., "Social Annotations in Web Search", In Proceedings of the ACM Annual Conference on Human Factors in Computing Systems, May 5, 2012, 10 Pages.
"International Preliminary Report on Patentability Issued in Application No. PCT/US2016/012399", dated Jul. 11, 2017, 9 Pages.
Pecovnik, Simon "Enterprise Graph Search—take 1", Retrieved From: https://www.ravn.co.uk/enterprise-graph-search/, Jan. 28, 2014, 5 Pages.
Perer, et al., "Visual Social Network Analytics for Relationship Discovery in the Enterprise", In Proceedings of the IEEE Conference on Visual Analytics Science and Technology, Oct. 23, 2011, pp. 71-79.
Resnick, P., "Internet Message Format", In Proceedings of Network Working Groups, Request for Comments: 5322, Obsoletes: 2822, Updates: 4021, Oct. 2008, 57 Pages.
Ronen, et al., "Social Networks and Discovery in the Enterprise (SaND)", In Proceedings of the 32nd International ACM SIGIR Conference on Research and Development in Information Retrieval, Jul. 19, 2009, 1 Page.

Roth, et al., "Suggesting Friends Using the Implicit Social Graph", In Proceedings of the 16th ACM SIGKDD International Conference on Knowledge Discovery and Data Mining, Jul. 25, 2010, 9 Pages.
Soussi, Rania, "Querying and Extracting Heterogeneous Graphs from Structured Data and Unstrutured Content", In PHD Thesis, Doctor of Computer Science Prepared at Ecole Centrale Paris, RIADI Laboratory, Jun. 22, 2012, 208 Pages.
Ubbesen, Christian, "Enterprise Graph Search", Retrieved From: https://findwise.com/blog/enterprise-graph-search/, Jan. 28, 2013, 2 Pages.
Yap, Jamie, "Graph Search Capabilities Offer Enterprise Benefits", Retrieved From: http://www.zdnet.com/graph-search-capabilities-offer-enterprise-benefits-7000011304/, Feb. 14, 2013, 5 Pages.
Yong Yin at al., An improved Search Strategy for Even Degree Distribution Networks, Jul. 2013, Academy Publisher, vol. 8, No. 7, pp. 1558-1565 (Year: 2013).
Jason J. Jung, Understanding information propagation on online social tagging systems, Nov. 4, 2012, Springer Science+ Business Media, Edition or vol. 48, pp. 745-754 (Year: 2012).
Barbie E. Keiser, Semisocial information Discovery, Novi Dec. 2013, Online searcher, pp. 16-22 (Year: 2013).
Anthony Stefanidis et al., Harvesting ambient geospatial information from social media feeds, Dec. 4, 2011, GeoJournal, Edition or vol. 78, pp. 319-338 (Year: 2011).
"Second Office Action Issued in Chinese Patent Application No. 201580011895.1", dated Aug. 9, 2019, 6 Pages.
"Second Office Action Issued in Chinese Patent Application No. 201580010703.5", dated Oct. 24, 2019, 5 Pages.
"Notice of Allowance Issued in U.S. Appl. No. 16/275,386", dated Mar. 6, 2020, 10 Pages.
Oyama, et al., "Analysis of Topics and Relevant Documents for Navigational Retrieval on the Web", I Proceedings of International Workshop on Challenges in Web Information Retrieval and Integration, Apr. 8, 2005, 6 Pages.
Chen, et al., "Towards Topic Trend Prediction on a Topic Evolution Model with Social Connection", In Proceedings of ACM International Conferences on Web Intelligence and Intelligent Agent Technology, Dec. 4, 2012, 5 Pages.
"Non Final Office Action Issued in U.S. Appl. No. 14/194,700", dated Nov. 5, 2019, 27 Pages.
"Non Final Office Action Issued in U.S. Appl. No. 14/296,747", dated Jan. 30, 2020, 32 Pages.
"Office Action Issued in Mexican Patent Application No. MX/a/2017/002699", dated Feb. 14, 2020, 7 Pages.
"Office Action Issued in Chinese Patent Application No. 201580047507.5", dated Apr. 3, 2020, 13 Pages.
"Non Final Office Action Issued in U.S. Appl. No. 16/057,229", dated Jun. 9, 2020, 8 Pages.
"Final Office Action Issued in U.S. Appl. No. 14/064,393", dated Jun. 12, 2020, 27 Pages.
"Notice of Allowance Issued in U.S. Appl. No. 14/194,700", dated Apr. 15, 2020, 9 Pages.
"Non Final Office Action Issued in U.S. Appl. No. 14/192,235", dated Apr. 17, 2020, 16 Pages.
"Final Office Action Issued in U.S. Appl. No. 14/296,747", dated Sep. 3, 2020, 31 Pages.
"Final Office Action Issued in U.S. Appl. No. 14/192,235", dated Nov. 18, 2020, 17 Pages.
"Office Action Issued in Chinese Patent Application No. 201580047507.5", dated Sep. 28, 2020, 14 Pages.
"First Examination Report Issued in Indian Patent Application No. 201647027554", dated Sep. 14, 2020, 5 Pages.
"Non Final Office Action Issued in U.S. Appl. No. 14/296,747", dated Jan. 4, 2021, 30 Pages.
"Office Action Issued in Chinese Patent Application No. 201580047507.5", dated Jan. 11, 2021, 11 Pages.

* cited by examiner

PERSISTED ENTERPRISE GRAPH QUERIES

CROSS-REFERENCE TO RELATED APPLICATIONS

This application is a continuation application of U.S. patent application Ser. No. 14/188,079, entitled "PERSISTED ENTERPRISE GRAPH QUERIES," filed on Feb. 24, 2014, and now U.S. Pat. No. 9,870,432, the entire disclosure of which is hereby incorporated herein by reference.

BACKGROUND

An enterprise graph query identifies an actor object set comprising one or more actor objects in a store of computer-readable enterprise objects, a target object set comprising one or more target objects in the store of computer-readable enterprise objects, and a relationship between the actor object set and the target object set. Enterprise objects are computer-readable objects in a store that relate to one or more entities, such as one or more user profiles or groups of user profiles (e.g., for a company or other organization). For example, enterprise objects may include user profiles, emails, word processing documents, slide presentations, digital photographs, digital videos, spreadsheets, databases, database tables, database rows or columns, database records, storage folders, Web pages, saved chat sessions, etc. For example, a simple enterprise graph query may request objects (the target objects) viewed by a particular user profile (the actor object) in the last fifteen days. Actor objects may be other types of objects, such as documents, etc. For example, an enterprise graph query may ask for all documents that have been viewed by user profiles who also viewed a specified document. In that case the specified document is the actor object (with an inferred action), and the other viewed documents are the target objects. Such enterprise graph queries may be very long and difficult for a user to enter, especially if the graph queries include combinations of multiple relationships between actor object set(s) and target object set(s).

SUMMARY

It can be useful to repeat enterprise graph queries to access previously-retrieved results and/or to access updates to the results. The discussion below relates to persisting enterprise graph queries in association with an entity so that such an entity can be provided with access to updated results to the query. This can be done by accessing the persisted query, without needing user input to re-enter the original query. Entities discussed herein are computer-readable data entities stored in computer hardware, and/or the computer hardware itself. For example, an entity may be a computer-readable user profile, a group of such user profiles, a computer-readable portal site or page (e.g., a portal Web page that can be viewed by a group of logged-in user profiles, or a portal page that can be provided to mobile applications to which specified user profiles are logged in), and/or data representing a specified geographical location (e.g., global positioning coordinates within a specified range, or other positioning indicators that indicate such a specified geographical location).

In one embodiment, the tools and techniques can include a computer search service receiving an enterprise graph query from a client computing device that is remote from the computer search service, with the enterprise graph query identifying an actor object set comprising one or more actor objects in a store of computer-readable enterprise objects, a target object set comprising one or more target objects in the store of computer-readable enterprise objects, and a relationship between the actor object set and the target object set. The search service can return results of the enterprise graph query to the client device. The search service can receive from the client device an indication of user input instructing the search service to persist the enterprise graph query, with the indication of user input also instructing the search service to associate the persisted enterprise graph query with an entity. Moreover, in response to receiving the indication of user input, the search service can persist the enterprise graph query and associate the persisted enterprise graph query with the entity.

In another embodiment of the tools and techniques, a first search client computer application of a first type can receive user input requesting that an enterprise graph query be persisted in association with an entity, with the enterprise graph query identifying an actor object set comprising one or more actor objects in a store of computer-readable enterprise objects, a target object set comprising one or more target objects in the store of computer-readable enterprise objects, and a relationship between the actor object set and the target object set. The first search client computer application can request that the enterprise graph query be persisted in association with the entity in response to receiving the user input requesting that the enterprise graph query be persisted. The first search client computer application can display a first user interface item representing the persisted enterprise graph query, with the first user interface item being displayed in a first format. The first search client computer application can receive user input associated with the entity, with the user input received by the first search client computer application being directed at and selecting the first user interface item. In response to receiving the user input directed at and selecting the first user interface item, the first client computer application can request a search service to perform a first instance of the enterprise graph query. The first search client computer application can receive from the search service results of the first instance of the enterprise graph query. The first search client computer application can display at least a portion of the results of the first instance of the enterprise graph query in response to receiving the user input directed at and selecting the first user interface item.

Also, a second search client computer application of a second type that is different from the first type can display a second user interface item representing the persisted enterprise graph query. As an example, the user interface item may be surfaced in a display region for persisted query representations when a particular user interface page is displayed. As another example, the user interface item may be surfaced as a suggestion when user input is provided in a search box (e.g., if a user starts typing "Documents modified", the system may suggest a corresponding persisted query, such as "Documents modified by Joe Johnson" using existing query suggestion techniques). The second search client computer application of the second type can receive user input associated with the entity, with the user input directed at and selecting the second user interface item. In response to receiving the user input directed at and selecting the second user interface item, the second client computer application can request the search service to perform a second instance of the enterprise graph query. The second search client computer application can receive from the search service results of the second instance of the enterprise graph query. The results of the second instance of the enterprise graph query may be the same as, entirely different from, or overlapping with the results of the first instance of the enterprise graph query, depending on the extent to which enterprise objects matching the query have or have not changed between the running of the first and second instances of the enterprise graph query. Moreover, the second search client computer application can display at least a portion of the results of the second instance of the enterprise graph query in response to receiving the user input directed at and selecting the second user interface item.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
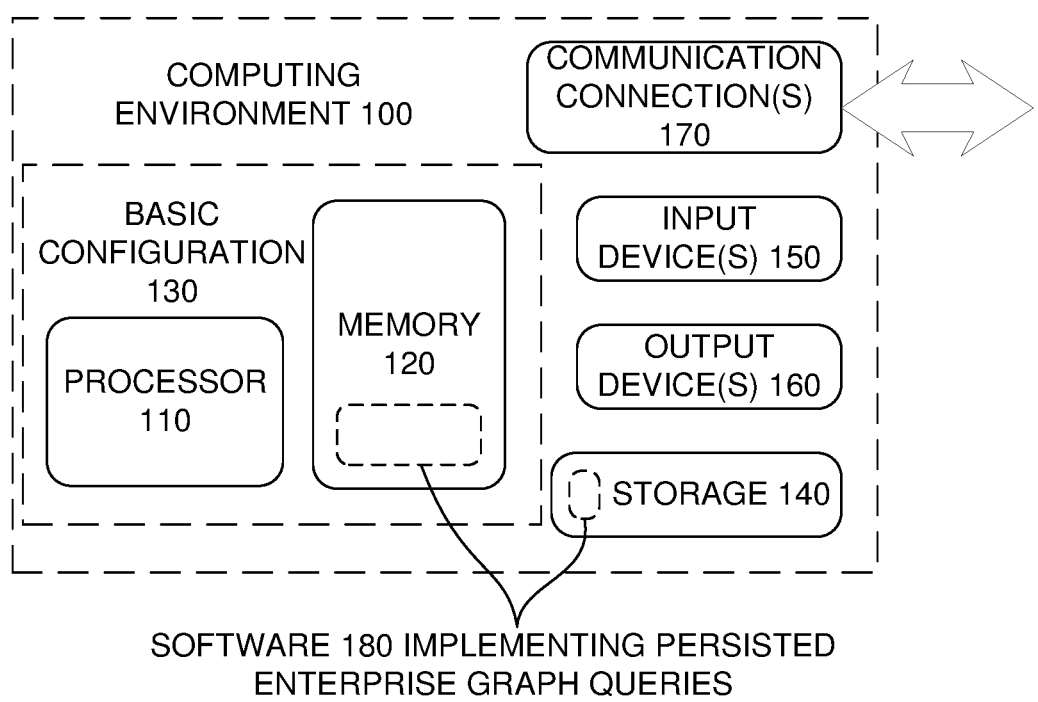
FIG. 1 is a block diagram of a suitable computing environment in which one or more of the described embodiments may be implemented.

Embodiments described herein are directed to techniques and tools for persistence of enterprise graph queries. Such improvements may result from the use of various techniques and tools separately or in combination.

Such techniques and tools may include persisting an enterprise graph query for a user in a way that is available across devices, and/or being able to subscribe to the results returned by a persisted enterprise graph query across devices. For example, when a user has entered in a search box an enterprise graph query (e.g., a query that reads "Presented to My colleagues about Contoso") the user may be enabled to provide user input to instruct a search service to save the enterprise graph query to easily check if any new items match the query and/or to access existing items that match the query. The persisted query may then be accessed and run from a broad set of experiences, for example, but not limited to, Web experiences (such as using a general Web browser client application), mobile app experiences (such as using a specific mobile application directed to use on a smartphone), tablet app experiences (such as using a specific mobile application directed to use on a tablet computer), client application (such as using a specific desktop client application that is configured to run on a personal computing device such as a laptop, desktop, a tablet running personal computing device software, etc.), LOB (line of business) application systems, etc.

When a user provides user input requesting that an enterprise graph query be persisted, the query (i.e., a computer-readable definition of the query) can be persisted in the enterprise graph service, or search service. A wide variety of devices and experiences that are authenticated to the search service can have access to the persisted query and may execute the query as a result of a user action or based on other criteria, such as timer jobs.

When an enterprise graph query has been persisted in response to user input, the results returned from the enterprise graph query can be available to devices and experiences as a stream of item notifications (which may include the updated items), making it possible to keep updated for any changes to the related graph index actor objects, relationships, or target objects.

Accordingly, one or more substantial technical benefits can be realized from the tools and techniques described herein. For example, enterprise graph queries can be run and/or re-run more with less effort on the part of a user, and possibly with fewer computing resources being involved. For example, re-running a query may involve a user simply providing a single user input action that selects a visual representation of the persisted query, or updated query result notifications for a persisted query may be provided automatically to a subscribed user profile.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

FIG. 1 illustrates a generalized example of a suitable computing environment (100) in which one or more of the described embodiments may be implemented. For example, one or more such computing environments can be used as a server computing device that is all or part of a search service, as all or part of a client computing device, etc. Generally, various different general purpose or special purpose computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing persisted enterprise graph queries. An implementation of persisted enterprise graph queries may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "mobile device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a mobile computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "select," "receive," "respond," and "send" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Search System and Environment

Figure 2:
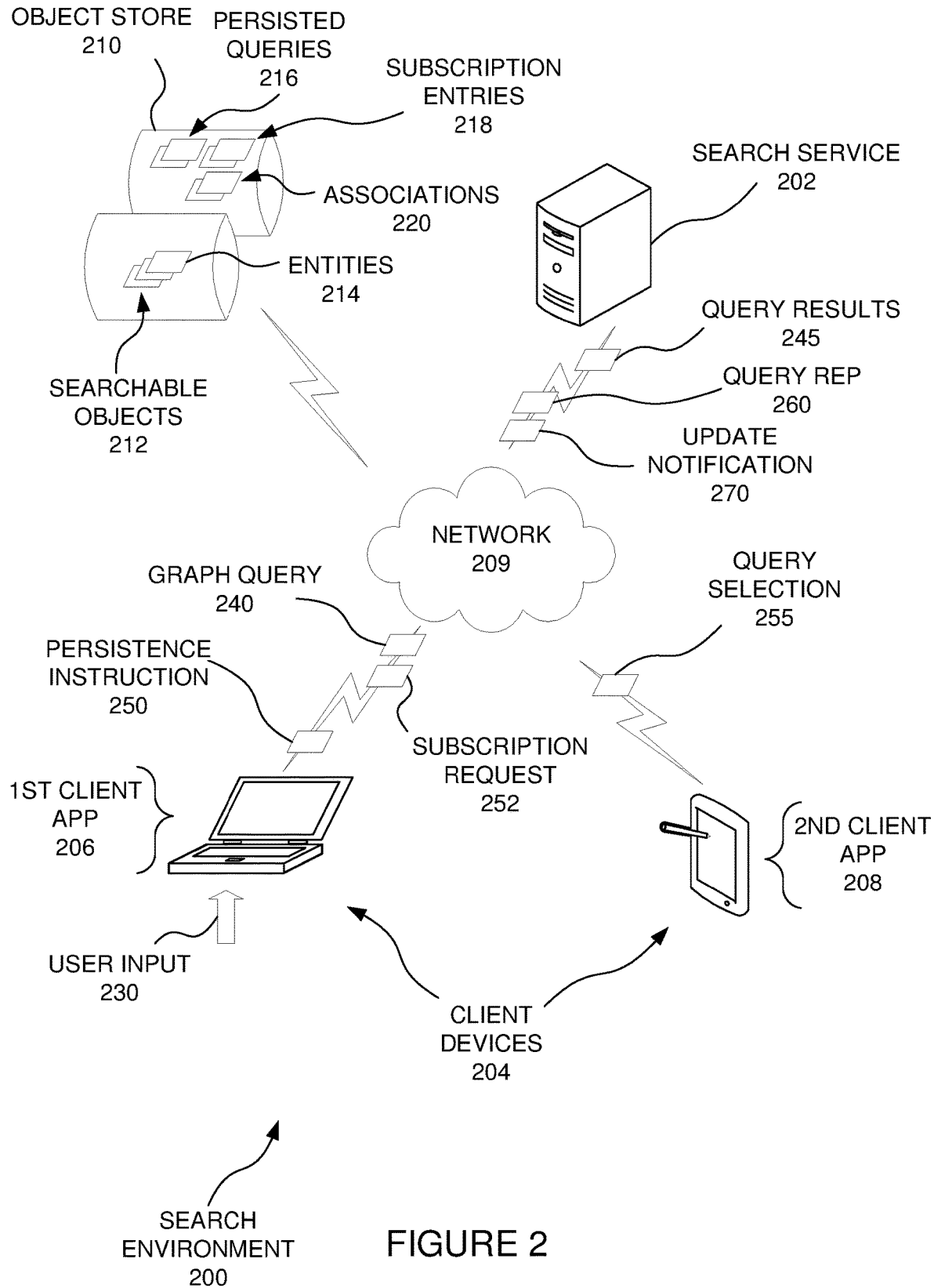
FIG. 2 is a schematic diagram of a search environment implementing persisted enterprise graph queries.

FIG. 2 is a block diagram of a search system or search environment (200) in conjunction with which one or more of the described embodiments may be implemented. The search environment (200) can include a search service (202), which can include one or more servers. The search service (202) may provide only searching features, or it may also provide one or more additional features, such as document management, social networking, email management, etc. The search environment (200) may also include one or more client devices (204), which can each run one or more client applications (206 and 208). The search service (202) may extend to the client applications (206 and 208) with some of the search service functionality being performed by specific client applications corresponding to the search service (202). The client devices (204) may include multiple different types of client devices (204), such as smart phones, tablets or slate devices, laptop computers, desktop computers, etc. Also, the client applications (206 and 208) may include multiple different types of client applications, such as general Web browsers and specific client applications (e.g., client applications that are specifically designed to operate with a particular type of search service, which may be done without providing general Web browsing capabilities), such as the following: specific mobile apps designed for a particular type of device such as a smartphone, a wearable computing device, and/or a tablet; specific desktop or laptop applications; specific line of business (LOB) applications; etc.

The client devices (204) and the search service (202) may be connected by a computer network (209), which may include a global computer network and/or one or more localized or proprietary computer networks, such as a wireless data network, a wide area network, a local area network, etc. Additionally, the search service (202) may be connected to an object store (210), which may be a single localized object store or a distribution of multiple object stores located on a single machine, or on multiple machines, in a single data center, spread across multiple data centers, etc. Objects in the object store (210) can include a variety of different types of computer-readable objects. For example, the objects may include searchable objects (212), which could include content objects such as documents (presentations, word processing documents, spreadsheets, Web pages, etc.), audio and/or video files, stored emails, entities (214) (e.g., user profiles or portal Web pages), etc.

The objects in the object store (210) may also include objects that are specific to query persistence features. For example, the object store (210) may include persisted queries (216), which are queries that are persisted in such a manner that the queries can be re-run at a later time. The object store (210) may also include subscription entries (218), which can each include an indication of one or more queries that are subscribed to, as well as one or more entities (214) that are subscribed to the one or more queries. The subscription entries (218) may also include other information, such as a start time of the subscription, an end time of the subscription, a frequency with which a check is to be done for updates, etc. The object store (210) may also include one or more associations (220) that associate one or more persisted queries (216) with one or more entities (214), so that the one or more entities can be provided with access to the persisted queries (216), such as by providing the entities (214) with representations of the persisted queries (216). For example, such representations could include a user interface item on a page for presentation in association with the entity (214). The entities (214), persisted queries (216), subscription entries (218), and associations (220) may be combined with each other and/or further separated out in particular implementations. For example, a persisted query (216) could be stored within a particular entity (214), thereby providing the association (220), which can be an implicit association by virtue of the location of the persisted query (216) within the entity (214).

Referring still to FIG. 2, the search service (202) and the object store (210) may also be integrated and/or separated out differently in different implementations. For example, the object store (210) may be located in one or more different locations that are remote from the search service (202) (for example, all or part of the object store may even be located in one or more of the client devices (204) and some of the functionality of the search service (202) may even be performed on one or more of the client devices (204)), or all or part of the object store (210) may be located locally with the search service (202), or all or part of the object store (210) may even be located within the client devices (204). The persisted queries (216) and/or other objects in the object store (210) may be saved in volatile and/or non-volatile memory. Accordingly, persistence of a query means that the query is saved for later use, but the query may be saved any of various different ways, including in volatile memory and/or non-volatile memory.

Multiple different types of computer-readable data can be exchanged between the search service (202) and the client devices (204). For example, a client device (204) may receive user input (230), which may prompt the client device (204) to send data to the search service (202). For example, the user input (230) may define a graph query (240), and a first client application (206) in a client device (204) may send the graph query (240) to the search service (202), requesting that the search service (202) perform the requested graph query (240) and return query results (245) to that same first client application (206).

As another example, the first client application (206) may receive user input (230) requesting that the query be persisted. For example, this user input (230) may be in the form of a request to pin a representation of the graph query (240) (i.e., to keep the representation on one or more views when the representation may not otherwise remain in such views, whether or not this functionality is referred to using the term "pinning" or similar terms in the particular implementation). In response, the first client application (206) can send a persistence instruction (250) to the search service (202), requesting that the search service (202) persist the graph query. This persistence instruction (250) may be associated with an entity, such as a user profile logged into the first client application (206), or a portal page being displayed by the first client application (206). In response to such a request, the search service (202) can save the query identified in the persistence instruction (250) as a persisted query (216) in the object store (210), and can save an association (220) of the persisted query (216), which associates the persisted query (216) with the entity (214) that is associated with the persistence instruction (250). The search service (202) may later provide one or more of the client applications (206 and/or 208) with a query representation (260), which can represent a persisted query (216), and which can be presented on a client device (204), so that user input (230) can be provided on the client device (204) to select the query representation (260) and thereby select the corresponding persisted query (216). For example, the search service (202) may provide the query representation (260) as part of a Web page or a page for a specific client application (e.g., as user interface hyperlink, tile, button, etc.).

Similarly, user input (230) can be provided to request that an entity (214) be subscribed to an identified query. In response the search service can persist the identified query as a persisted query (216) if the query has not already been persisted. Additionally, the search service (202) can save a subscription entry (218) that associates a persisted query (216) with an entity (214) that is subscribing to the persisted query (216). The search service (202) can then monitor the object store for updates to the persisted query (216). For example, the persisted query (216) may be re-run periodically. As another example, the search service (202) and/or the object store (210) may monitor updates to the objects in the object store (210), and may determine whether each such update impacts a query that is the subject of a current subscription entry (218). Either way, the search service (202) may determine whether the update is sufficiently significant to warrant sending an update notification (270). For example, the search service (202) may examine a search ranking score of a new item added to the object store (210), such as a relevancy and/or importance score that is used in ranking query results (245) (e.g., a search engine combined feature score). For objects that are modified, the search service (202) may consider the extent and type of the modification, possibly in combination with a search result score for the modified item, in determining whether a threshold level is reached for warranting the sending of an update notification (270) to the entity (214) identified in the pertinent subscription entry (218). Such an update notification (270) may be sent to one or more client applications (206 and/208) on one or more client devices (204), which need not be the same client device (204) or client application (206 or 208) from which the subscription request (252) or the graph query (240) for that subscription was received (though they may be the same device/application in some situations).

User input (230) can be provided to select a persisted query (216), such as by providing user input directed at and selecting a representation of a persisted query (216). In response to such user input (230), a client application (206 or 208) can send a query selection (255) to the search service (202), requesting that the persisted query (216) be run, and that updated query results (245) be returned. In response to such a query, the search service (202) can run the query. In some examples, the persisted query (216) may have already been provided to the client application (206 or 208), such as where the persisted query (216) is contained within a Web page. In such a case, the query selection (255) may include the persisted query (216) itself. Alternatively, the query selection (255) may instruct the search service (202) to retrieve the persisted query (216) from the object store (210). Either way, the search service (202) can run the persisted query (216) and provide updated results to the client application (206 or 208), which may be a different type of client application (206 or 208) on a different type of client device (204) from one that provided that query and requested that it be persisted.

Figure 3:
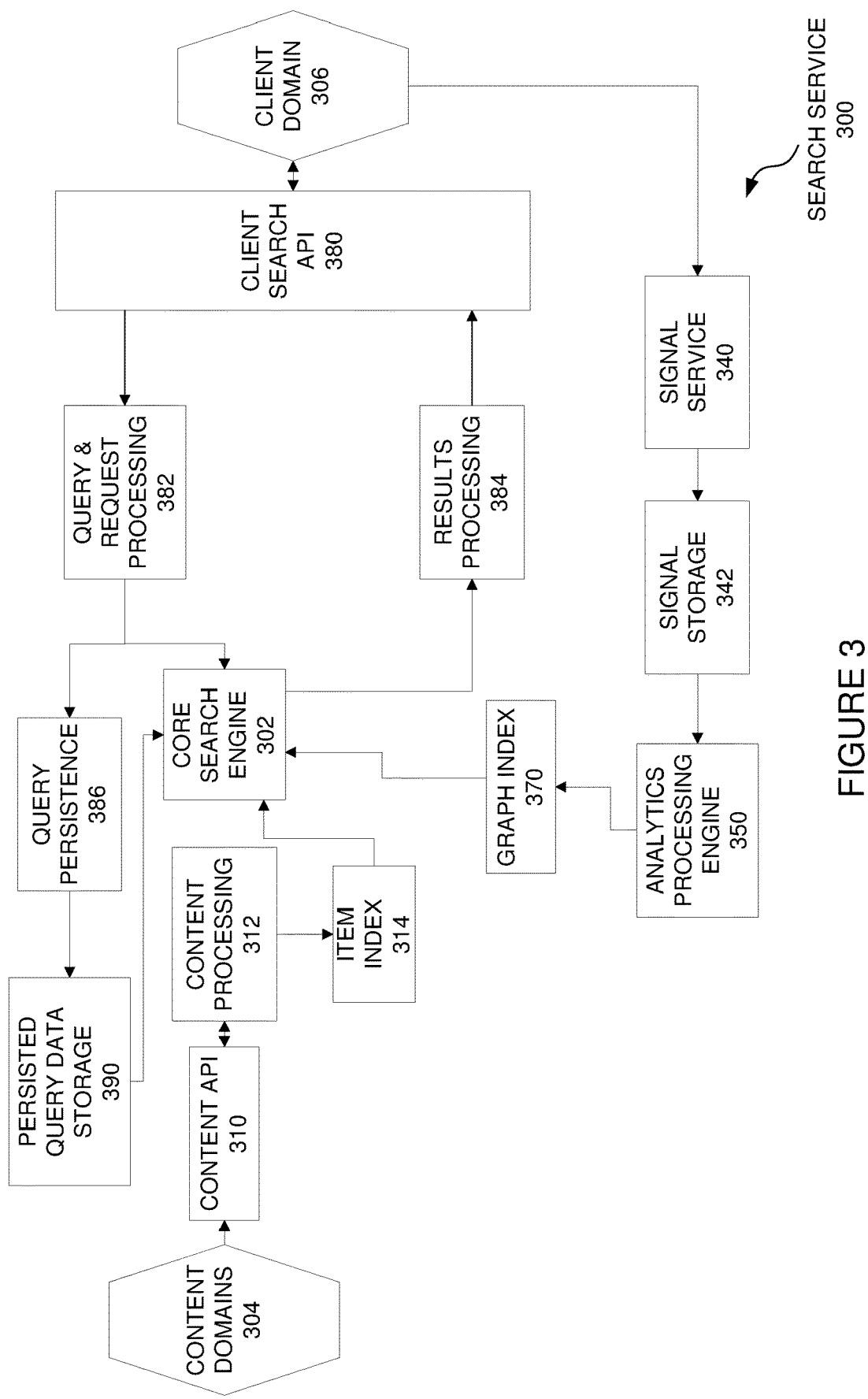
FIG. 3 is a schematic diagram of a search service implementing persisted enterprise graph queries.

Referring now to FIG. 3, the search service (300) will be discussed in more detail. The search service (300) can include a core search engine (302) that runs enterprise graph queries using information provided from a content domain (304) and a client domain (306). The content domain (304) can include computer-readable objects, such as the computer readable objects discussed above with respect to FIG. 2. A content application programming interface (API) (310) can receive content objects from the content domain (304). The content API (31) can pass the content objects to the content processing component (312), which can process the content objects to populate an item index (314), which can be used by the core search engine (302) in running queries.

Additionally, a signal service (340) can intercept signals from the client domain (306), with the signals representing actions performed on and/or by the content objects from the content domain (304). For example, such signals may represent a content object being viewed by a user profile, edited by a user profile, connected as a friend to a user profile, one user profile being made a work colleague of another user profile, a document being created or edited by a particular user profile, etc. The signal service (340) can store representations of these signals in the signal storage (342), which can include representations of actions, as well as surrounding information (objects performing or receiving the actions, time of the actions, etc.). An analytics processing engine (350) can use the information from the signal storage (342) to populate a graph index (370) that represents the stored signals in an indexed manner for use by the core search engine (302) in performing graph queries. The graph index (370) and the item index (314) may each be a key value store, or one or both may be in some other format. Accordingly, the core search engine (302) can perform enterprise graph queries using both the item index (314) and the graph index (370). In running some queries only one or the other of the indexes (314 and 370) may be used, and in others, both of the indexes (314 and 370) may be used. The results of the queries can be ranked, such as with a ranker that includes multiple features that can be weighted and combined to arrive at ranking scores for the query results.

The client domain (306) can submit requests and instructions to the search service (300) through a client search API (380), which can pass such requests and instructions to a query and request processing component (382). For query requests, the query and request processing component (382) can pass processed queries to the core search engine (302) to be run using the item index (314) and/or the graph index (370). The core search engine (302) can pass results to a results processing component (384), which can process the query results and pass them back to the client domain (306) through the client search API (380). For client requests to persist queries and/or enter subscriptions, the query and request processing component (382) can process the requests and pass them to a query persistence component (386), which can persist queries, associations and/or subscription entries as needed in a persisted query data storage (390). The persisted queries can be provided to the core search engine (302) for use in running or re-running persisted queries in response to requests such as user input requests, or the queries can be run automatically to provide update notifications and/or updated query results to the client domain (306).

Figure 4:
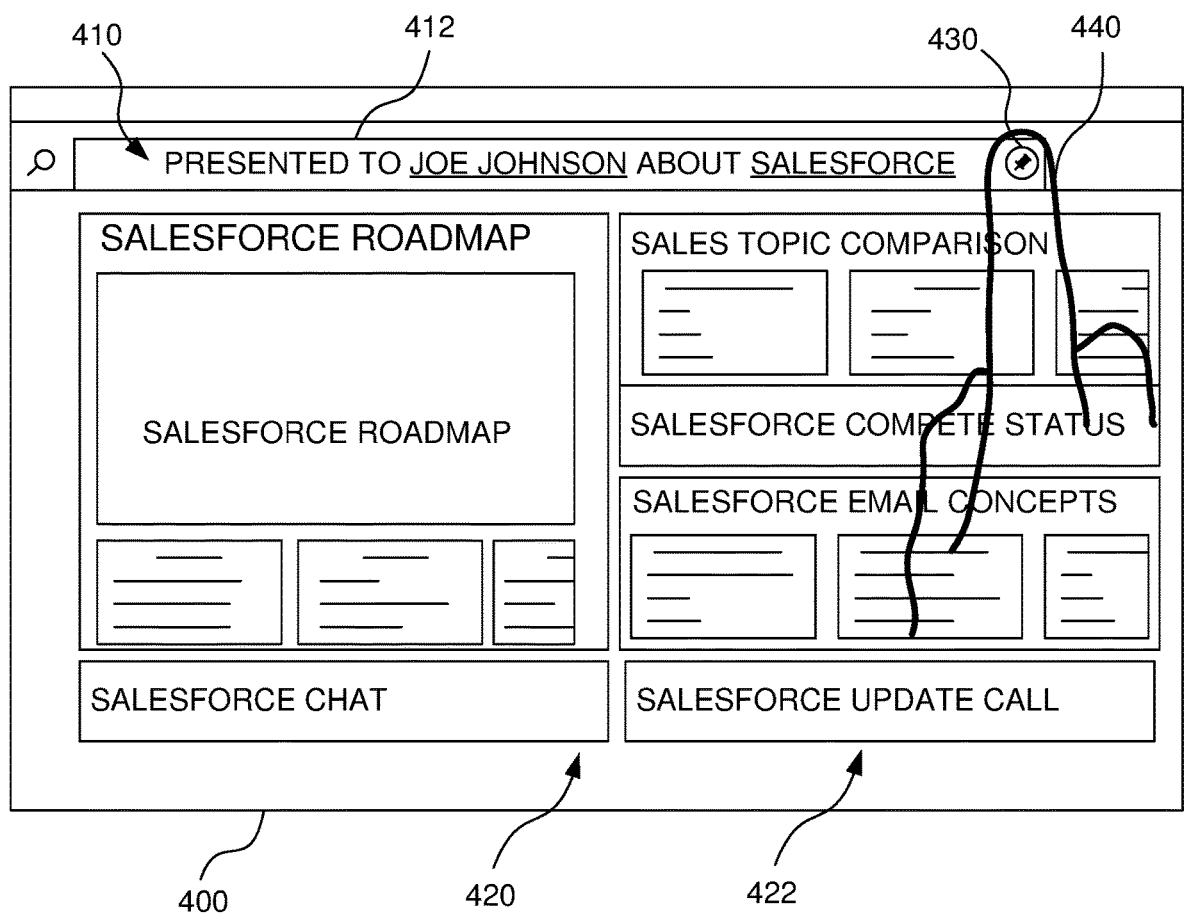
FIG. 4 is an illustration of a user interface display of a search client computer application running on a client device.

Some examples of user interface illustrations for persisted enterprise graph queries will now be discussed with reference to FIGS. 4-6. Referring to FIG. 4, an example of a user interface display (400) for an application on a tablet client device is illustrated. In the display (400), a definition (410) of an enterprise graph query is shown in a search bar (412), with the definition (410) being a representation of the graph query itself. In the example, the enterprise graph query definition reads as "PRESENTED TO JOE JOHNSON ABOUT SALESFORCE." This is an example of a compound query, with a JOE JOHNSON user profile being an actor object, and the term SALESFORCE being a content term to be searched within the target objects (those objects presented to the JOE JOHNSON with content about the term SALESFORCE). Alternatively, SALESFORCE could be considered another actor object, such as where SALESFORCE is the name of a project and the presentations of the target objects must have been presented in a meeting for that project to fall within the query. Either way, results (420) of the query can be displayed in a content region (422) of the display (400), which can be a separate spatial region of the display from the search region or search bar (412).

The display (400) can include a pinning icon (430) adjacent to the definition (410). User input directed at and selecting the pinning icon (430) can be provided to indicate that the query represented by the definition (410) is to be persisted (and possibly that it is to be subscribed to as well), so that the query will be readily available at a later time. For example, a user's finger (440) may touch the area of the pinning icon (430) where the display (400) is on a touch screen. Similarly, the pinning icon could be selected by any of various other types of user input actions, such as a mouse click, a keyboard entry, a voice command, a non-touch gesture, etc. The term "pinning icon" refers to an icon that can be selected to "pin" a representation of the query, which refers to instructing the computer system to surface a representation of the query to the current display and/or other corresponding displays in other environments or views, even if that representation would not otherwise be surfaced in such environments or views (e.g., even if the query would not appear on a recent and/or frequent query list in such environments or views). Accordingly, a pinning icon may be in some form other than that of a pin, which is illustrated in FIG. 4. The same is true of an "unpinning icon" discussed below, which can be selected to instruct the computer system to unpin the representation of the query, so that the representation would only be surfaced if it were dictated by some other functionality (e.g., recent and/or frequent query list).

Figure 5:
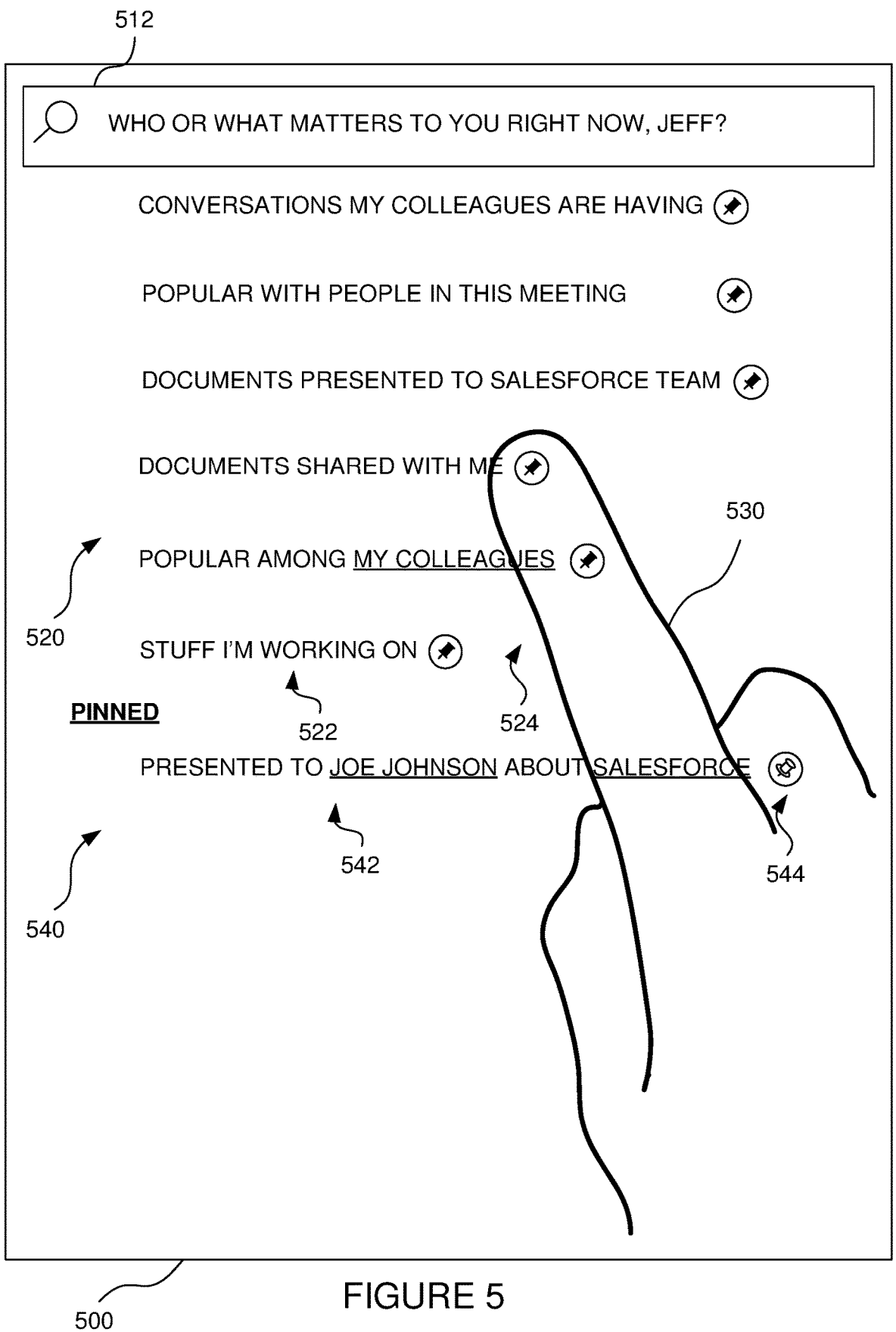
FIG. 5 is an illustration of another user interface display of another search client computer application running on another client device.

Referring now to FIG. 5, a different display (500) for the same entity (e.g., the same user profile, such as a user profile for "JEFF") is displayed. However, the display (500) can be for a different client application from the display (400) discussed above with reference to FIG. 4, and the display (400) may be on a different client device from the display (500). As can be seen, the display (500) includes a search bar (512), where no definition of a query is currently being displayed. The display (500) also includes an un-pinned query region (520) with displayed query representations (522) that have not been pinned or persisted in response to user input instructions, such as representations of other queries that have been entered by a system administrator, other queries that have been conducted recently by the user profile, etc. Adjacent to each of the non-pinned query representations (522) is a pinning icon (524), which can be selected by user input to pin the corresponding adjacent query representation (522), and to persist the corresponding query. FIG. 4 illustrates a user's finger (530) touching a pinning icon (524) for a query representation (522) labeled "DOCUMENTS SHARED WITH ME." In response to this user input, the query representation (522) labeled "DOCUMENTS SHARED WITH ME" can be pinned and the corresponding query can be persisted in association with the current user profile (JEFF).

The display (500) can further include a pinned query region (540) that displays previously-pinned query representations (542), which represent queries that have been persisted in response to previous user input. For example, in the display (500), the pinned query region (540) includes the previously-pinned query representation (542) labeled "PRESENTED TO JOE JOHNSON ABOUT SALESFORCE," which was pinned in a different client application, as discussed above with reference to FIG. 4. Additionally, an unpinning icon (544) can be located adjacent to each of the previously-pinned query representations (542). An unpinning icon (544) indicates that the adjacent query representation (542) has already been pinned. User input directed at and selecting the unpinning icon (544) can result in the computer system unpinning the corresponding query representation (542), as well as de-persisting the corresponding query (i.e., removing the corresponding persisted query from persisted queries for the associated entity).

Though not shown in FIG. 5, the query representation "DOCUMENTS SHARED WITH ME" can be immediately added to the pinned query region (540) after its adjacent pinning icon (524) is selected.

Figure 6:
FIG. 6 is an illustration of yet another user interface display of yet another search client computer application running on yet another client device.

Referring now to FIG. 6, yet another different computer user interface display (600) is illustrated. This user interface display (600) can be for yet another different client application and yet another different client device. The display (600) includes user interface items in the form of tiles (610), which can be selected to invoke features represented by the tiles (e.g., by touching the tile on a touch screen). Included among the tiles are a tile labeled "DOCS SHARED WITH ME," which corresponds to the query representation (522) labeled "DOCUMENTS SHARED WITH ME" in FIG. 5 and a tile labeled "PRESENTED TO JOE ABOUT SALESFORCE" corresponding to the query definition (410) that reads "PRESENTED TO JOE JOHNSON ABOUT SALESFORCE" in FIG. 4. These tiles (610) can be selected to request updated query results for the corresponding persisted query, even though the persisted query was defined and requested to be persisted from a different client device using a different client application from the one where the tile (610) for that persisted query is currently presented for selection.

III. Persisted Enterprise Graph Query Techniques

Several persisted enterprise graph query techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique. The techniques discussed below may be performed at least in part by hardware logic.

Figure 7:
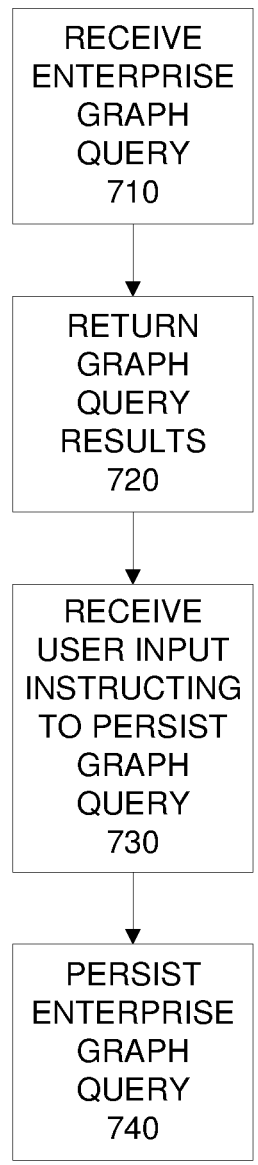
FIG. 7 is a flowchart of an enterprise graph query persistence technique.

Referring to FIG. 7, a persisted enterprise graph query technique will be described. The technique can include a computer search service receiving (710) an enterprise graph query from a client computing device that is remote from the computer search service. The enterprise graph query can identify an actor object set including one or more actor objects in a store of computer-readable enterprise objects, a target object set including one or more target objects in the store of computer-readable enterprise objects, and a relationship between the actor object set and the target object set. The search service can return (720) results of the enterprise graph query to the client device. The search service can receive (730) from the client device an indication of user input instructing the search service to persist the enterprise graph query. For example, the indication of user input may be received (730) after the search service returns (720) the results of the enterprise graph query to the client device. The indication of user input may further instruct the search service to associate the persisted enterprise graph query with an entity, such as a set of one or more user profiles or a portal page. In response to receiving (730) the indication of user input, the search service can persist (740) the enterprise graph query and associate the persisted enterprise graph query with the entity.

The technique of FIG. 7 can further include the search service providing a first set of results from the persisted enterprise graph query to a first client application of a first type, with the first client application being associated with the entity when the first set of results are provided to the first client application. Additionally, the search service can provide a second set of results from the persisted enterprise graph query to a second client application of a second type that is different from the first type, with the second client application being associated with the entity when the second set of results are provided to the second client application.

The actor object set can include a user profile logged in at a client application running on the client device when the computer search service receives (730) the indication of user input instructing the search service to persist the enterprise graph query. The actor object set can be the user profile logged in at the client application running on the client device when the computer search service receives the indication of user input instructing the search service to persist the enterprise graph query. The actor object set can include a representation of a computer-readable portal page managed by a service that is remote from a client application that runs on the client device and interacts with the search service.

The relationship in the technique of FIG. 7 can be an action represented by one or more computer system signals received by the search service, where the action involves the actor object set and the target object set. For example, the action may be an action performed on the target object set, such as one or more explicit actions directed at the target object set, or even an implicit action, such as a device entering a specified geographical location. For example, when a device enters a specified geographical location, that action can be identified and signaled as an action performed on a data representation of that location and/or an action performed by the data representation of that location. Also, when a device enters a specified geographical location that is represented by an entity (e.g., a data structure specifying the location) related to a persisted enterprise graph query, the computer system can respond by presenting a representation of that persisted enterprise graph query and/or automatically running the persisted enterprise graph query.

The technique of FIG. 7 may further include storing a subscription entry indicating that the entity is to receive notifications of updates to results of the enterprise graph query. The entity may be automatically provided with one or more notifications of one or more updates to the results of the persisted enterprise graph query. Also, the search service may respond to the subscription entry by monitoring updates to results of the enterprise graph query. Moreover, the search service may recognize the update(s) to the results of the persisted enterprise graph query while monitoring updates to the results. The providing of the entity with the notification (s) may be done in response to the recognizing of the one or more updates while monitoring the updates to the results.

The technique of FIG. 7 may further include the search service receiving a request to run the persisted enterprise graph query, and the search service may respond to the request to run the persisted enterprise graph query by returning updated results to the enterprise graph query.

Figure 8:
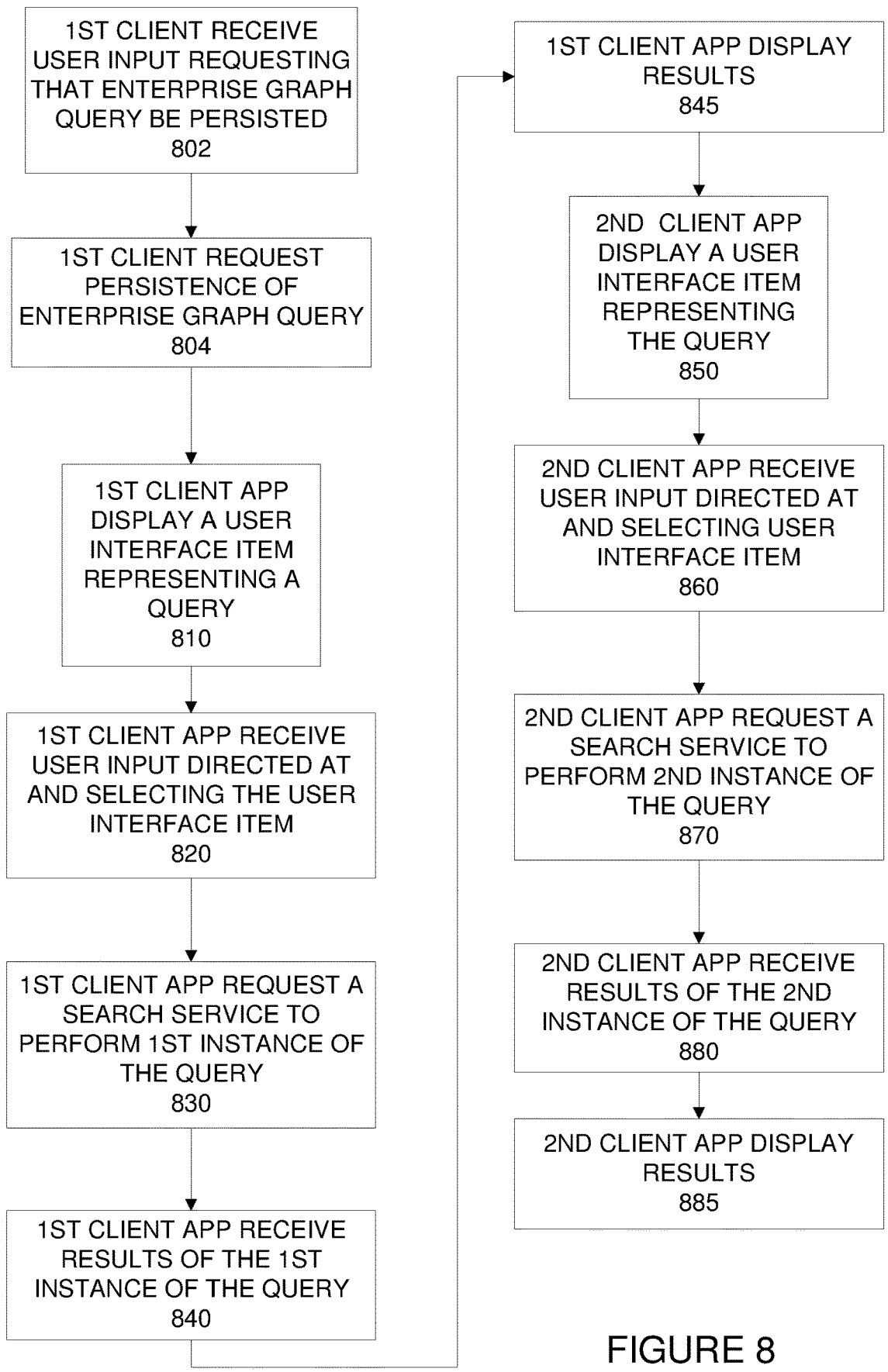
FIG. 8 is a flowchart of another enterprise graph query persistence technique.

Referring now to FIG. 8, another enterprise graph query persistence technique will be discussed. In the technique, a first search client computer application of a first type can receive (802) user input requesting that an enterprise graph query be persisted in association with an entity. The enterprise graph query can identify an actor object, a target object set, and a relationship between the actor object set and the target object set. The first search client computer application can request (804) that the enterprise graph query be persisted in association with the entity in response to receiving (802) the user input requesting that the enterprise graph query be persisted.

The first search client computer application can display (810) a first user interface item representing the persisted enterprise graph query. The first user interface item can be displayed in a first format. The first search client computer application of the first type can receive (820) user input associated with the entity, with the user input being directed at and selecting the first user interface item. In response to receiving (820) the user input directed at and selecting the first user interface item, the first client computer application can request (830) a search service to perform a first instance of the enterprise graph query. The first search client computer application can receive (840) back from the search service results of the first instance of the enterprise graph query. The first search client computer application can display (845) at least a portion of the results of the first instance of the enterprise graph query in response to receiving (820) the user input directed at and selecting the first user interface item.

The technique of FIG. 8 can also include a second search client computer application of a second type that is different from the first type displaying (850) a second user interface item representing the persisted enterprise graph query. The second search client of the second type can receive (860) user input associated with the entity, with the user input directed at and selecting the second user interface item. In response to receiving the user input directed at and selecting the second user interface item, the second client computer application can request (870) the search service to perform a second instance of the persisted enterprise graph query. The second search client computer application can receive (880) from the search service results of the second instance of the enterprise graph query. The second search client computer application can display (885) at least a portion of the results of the second instance of the enterprise graph query in response to receiving (860) the user input directed at and selecting the second user interface item.

The first search client computer application may be a general Web browser, and the second search client computer application may be a specific application configured to interact with one or more remote enterprise computing services (e.g., a specific mobile application, a line of business desktop application, another specific desktop application, etc.).

The second search client computer application can be running on a mobile computing device (such as a handheld device (e.g., a smartphone or tablet) and/or a wearable computing device (e.g., a pair of computing glasses or a smart watch)) and the first search client computer application can be running on a computing device that is a different type from the mobile computing device. Additionally, the second search client computer application may be a mobile application.

The user input requesting that the enterprise graph query be persisted can include user input requesting that a visual representation of the enterprise graph query be pinned to a user interface display. The first search client computer application can receive user input requesting that the visual representation of the enterprise graph query be unpinned from the user interface display. The first search client computer application can request that the enterprise graph query cease from being persisted in response to receiving the user input requesting that the visual representation of the enterprise graph query be unpinned.

In one implementation of the technique of FIG. 8, the visual representation may be termed a first visual representation and the user interface display may be termed a first user interface display. The technique may further include the second search client computer application receiving user input requesting that a second visual representation of the enterprise graph query be unpinned from a second user interface display. The second search client computer application can request that the enterprise graph query cease from being persisted in response to receiving the user input requesting that the second visual representation of the enterprise graph query be unpinned.

The technique of FIG. 8 may include the second search client computer application receiving an automatic notification of one or more updates to one or more results of the enterprise graph query. In response to the second search client computer application receiving the notification, the second search client computer application can present a user notification of the update(s).

The technique of FIG. 8 may further include the second the second search client computer application monitoring updates to results of the enterprise graph query. The second search client computer application can recognize one or more updates to the results of the persisted enterprise graph query as part of monitoring the updates to the results. Additionally, the second search client computer application can provide the entity with one or more notifications in response to the recognizing of the one or more updates as part of monitoring the updates to the results.

Figure 9:
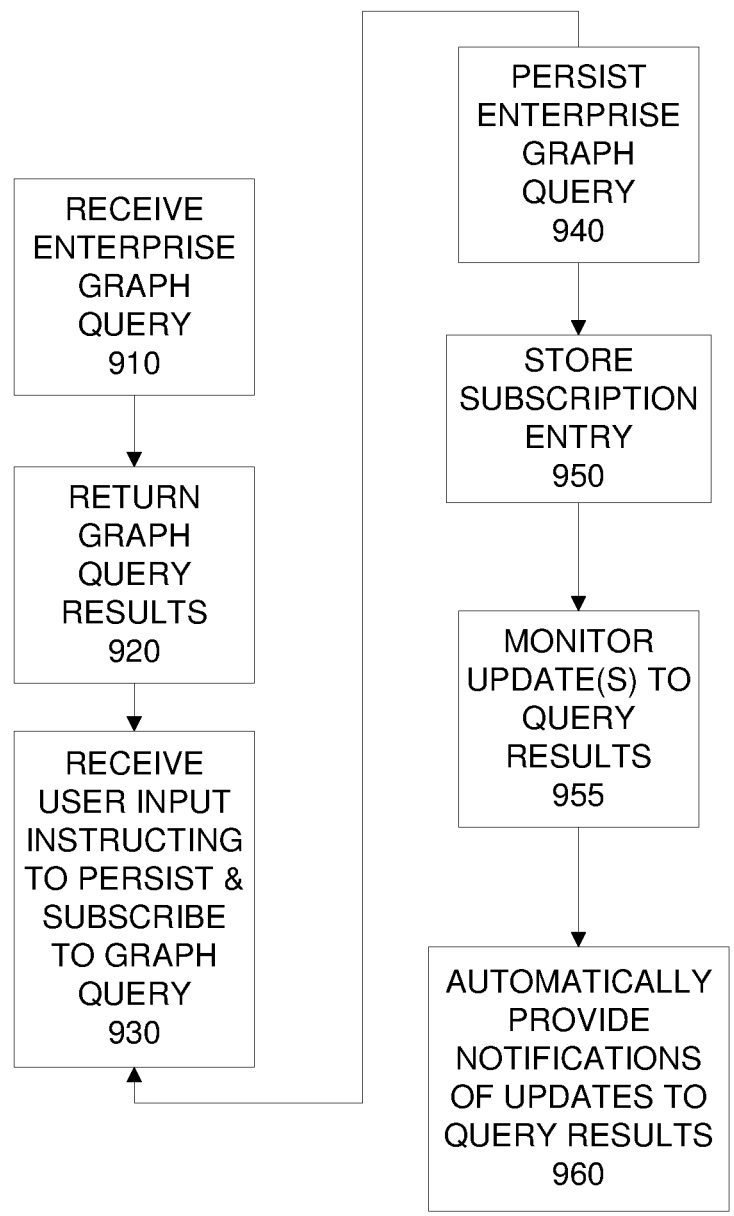
FIG. 9 is a flowchart of yet another enterprise graph query persistence technique.

Referring now to FIG. 9, yet another enterprise graph query persistence technique will be discussed. The technique can include a computer search service receiving (910) an enterprise graph query from a first client computing device that is remote from the computer search service, with the enterprise graph query identifying an actor object set, a target object set, and a relationship between the actor object set and the target object set. The search service can return (920) results of the enterprise graph query to the client device. After returning (920) the results of the enterprise graph query, the search service can receive (930) from the client device an indication of user input instructing the search service to persist the enterprise graph query, with the indication of user input also instructing the search service to associate the enterprise graph query with an entity and to subscribe the entity to the enterprise graph query. The search service can persist (940) the enterprise graph query, and can store (950) a subscription entry indicating that the entity is to receive notifications of updates to results of the enterprise graph query.

The search service can the search service can automatically monitor (955) one or more updates to the results of the persisted enterprise graph query. The monitoring (955) can include determining that one or more updates to the results of the persisted enterprise graph query has a score that is above a threshold score for providing the entity with notifications. In response to determining that one or more updates to the results of the persisted enterprise graph query has a score that is above the threshold score for providing the entity with notifications, the technique can include automatically providing (960) the entity with notifications of the one or more updates to the results of the persisted enterprise graph query. The updates can include a modification of an existing computer-readable object represented by an item in the results of the persisted enterprise graph query and/or an addition of a new computer-readable object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method comprising:
    receiving an enterprise graph query from a first client application associated with an entity that is executed on a first client device, the enterprise graph query identifying an actor object set comprising one or more actor objects in a store of computer-readable enterprise objects, a target object set comprising one or more target objects in the store of computer-readable enterprise objects, and a relationship between the actor object set and the target object set;
    running the enterprise graph query;
    returning a first set of results of the enterprise graph query to the first client application from which the enterprise graph query was received;
    persisting the enterprise graph query;
    associating the persisted enterprise graph query with the entity;
    based on the association, providing a selectable representation of the persisted enterprise graph query to one or more client applications associated with the entity, wherein the selectable representation is provided for display within a view of the one or more client applications independent of query input being received at the one or more client applications to which the selectable representation is responsive, and the one or more client applications include at least a second client application associated with the entity that is a different client application than the first client application from which the enterprise graph query was received and is executed on one of the first client device or a second client device;

receiving, from the second client application, an indication of a selection of the displayed representation;

in response to receiving the indication, re-running the persisted enterprise graph query; and returning a second set of results of the persisted enterprise graph query to the second client application from which the query selection to re-run the persisted enterprise graph query was received.

2. The method of claim 1, wherein the first client application is of a first type and the second client application is of a second type that is different from the first type.

3. The method of claim 1, wherein the actor object set further comprises a user profile logged in at the first client application.

4. The method of claim 3, wherein the actor object set is the user profile logged in at the first client application.

5. The method of claim 1, wherein the actor object set further comprises a representation of a computer-readable portal page managed by a service that is remote from the first client application.

6. The method of claim 1, wherein the relationship is an action represented by one or more computer system signals, the action involving the actor object set and the target object set.

7. The method of claim 1, further comprising:
storing a subscription entry indicating that the entity is to receive notifications of updates to the first set of results of the enterprise graph query; and
automatically providing the entity with one or more notifications of one or more updates to the first set of results of the persisted enterprise graph query.

8. The method of claim 7, further comprising:
monitoring for the updates to the first set of results of the enterprise graph query;
recognizing the one or more updates while monitoring; and
providing the entity with the one or more notifications in response to the recognizing of the one or more updates.

9. The method of claim 1, further comprising:
receiving from the first client application an indication of an instruction to persist the enterprise graph query and associate the persisted enterprise graph query with the entity; and
based on the indication of the instruction:
persisting the enterprise graph query; and
associating the persisted enterprise graph query with the entity.

10. The method of claim 9, wherein the indication of the instruction is a pinning of a visual representation of the enterprise graph query to a display in a user interface of the first client application.

11. The method of claim 1, wherein providing the selectable representation of the persisted enterprise graph query to the one or more client applications associated with the entity comprises:
causing the selectable representation to remain displayed within a region of the view associated with persisted enterprise graph queries.

12. A computer system comprising:
at least one processor; and
a memory comprising instructions stored thereon that when executed by the at least one processor cause the at least one processor to perform acts comprising:
receiving an enterprise graph query from a first client application associated with an entity that is executed on a first client device, the enterprise graph query identifying an actor object set comprising one or more actor objects in a store of computer-readable enterprise objects, a target object set comprising one or more target objects in the store of computer-readable enterprise objects, and a relationship between the actor object set and the target object set;
performing a first instance of the enterprise graph query;
returning results of the first instance of the enterprise graph query to the first client application for display;
persisting the enterprise graph query;
associating the persisted enterprise graph query with the entity;
based on the association, providing a selectable representation of the persisted enterprise graph query to one or more client applications associated with the entity, wherein the selectable representation is provided for display within a view of the one or more client applications independent of query input being received at the one or more client applications to which the selectable representation is responsive, and the one or more client applications include at least a second client application associated with the entity that is a different client application than the first client application from which the enterprise graph query was received and is executed on one of the first client device or a second client device;
receiving an indication of a selection of the displayed representation from the second client application;
in response to receiving the indication, performing a second instance of the enterprise graph query; and
returning results of the second instance of the enterprise graph query to the second client application for display.

13. The computer system of claim 12, wherein the first client application is a general Web browser, and the second client application is a specific application configured to interact with one or more remote enterprise computing services.

14. The computer system of claim 13, wherein the second client application is executed on the second client device, the second client device is a mobile computing device, and the second client application is a mobile application.

15. The computer system of claim 12, wherein the acts further comprise:
receiving a request for the enterprise graph query to be persisted in association with the entity from the first client application, wherein the request is received in response to a visual representation of the enterprise graph query being pinned to display in a user interface of the first client application.

16. The computer system of claim 15, wherein the acts further comprise:
receiving a request for the enterprise graph query to cease from being persisted in association with the entity from the first client application in response to the visual representation of the enterprise graph query being unpinned from the display in the user interface of the first client application.

17. The computer system of claim 15, wherein the visual representation is a first visual representation, and the display in the user interface of the first client application is a first user interface display, and the acts further comprise:

receiving a request for the enterprise graph query to cease from being persisted in association with the entity from the second client application in response to a second visual representation of the enterprise graph query being unpinned from a second user interface display in a user interface of the second client application.

18. The computer system of claim 12, wherein the acts further comprise:

providing an automatic notification of one or more updates to one or more results of the enterprise graph query to one or more of the first client application and the second client application for display in a user interface of the first client application and the second client application, respectively.

19. The computer system of claim 12, wherein the acts further comprise:

monitoring for updates to results of the enterprise graph query;

recognizing one or more updates to the results of the persisted enterprise graph query;

providing the entity with one or more notifications in response to the recognizing of the one or more updates.

20. One or more computer-readable storage media having computer-executable instructions embodied thereon that, when executed by at least one processor, cause the at least one processor to perform acts comprising:

receiving an enterprise graph query from a first client application associated with an entity that is executed on a first client device, the enterprise graph query identifying an actor object set comprising one or more actor objects in a store of computer-readable enterprise objects, a target object set comprising one or more target objects in the store of computer-readable enterprise objects, and a relationship between the actor object set and the target object set;

running the enterprise graph query;

returning results of the enterprise graph query to the first client application from which the enterprise graph query was received;

persisting the enterprise graph query;

associating the persisted enterprise graph query with the entity;

storing a subscription entry indicating that the entity is to receive notifications of updates to results of the persisted enterprise graph query;

based on the association, providing a selectable representation of the persisted enterprise graph query to one or more client applications associated with the entity, wherein the selectable representation is provided for display within a view of the one or more client applications independent of query input being received at the one or more client applications to which the selectable representation is responsive, and the one or more client applications include at least a second client application associated with the entity that is a different client application than the first client application from which the enterprise graph query was received and is executed on one of the first client device or a second client device;

receiving, from the second client application, an indication of a selection of the displayed representation;

in response to receiving the indication, re-running the persisted enterprise graph query;

returning updated results of the persisted enterprise graph query to the second client application from which the query selection to re-run the persisted enterprise graph query was received;

automatically monitoring for updates to the results of the persisted enterprise graph query, including the updated results, to determine whether one or more updates to the results of the persisted enterprise graph query has a score that is above a threshold score for providing the entity with notifications; and in response to determining that the one or more updates to the results of the persisted enterprise graph query has a score that is above the threshold score for providing the entity with notifications, providing the entity with one or more notifications of the one or more updates to the results of the persisted enterprise graph query.

\* \* \* \* \*